United States Patent
Vu et al.

(10) Patent No.: US 12,548,307 B2
(45) Date of Patent: Feb. 10, 2026

(54) OBJECT DETECTION WITH CROSS-DOMAIN MIXING

(71) Applicant: Deere & Company, Moline, IL (US)

(72) Inventors: Minh Thanh Vu, San Francisco, CA (US); Baochen Sun, Bellevue, WA (US); Bodi Yuan, Sunnyvale, CA (US); Alexander Ngai, Irvine, CA (US); Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 179 days.

(21) Appl. No.: 18/388,773

(22) Filed: Nov. 10, 2023

(65) Prior Publication Data

US 2024/0161477 A1    May 16, 2024

Related U.S. Application Data

(60) Provisional application No. 63/424,828, filed on Nov. 11, 2022.

(51) Int. Cl.
*G06V 10/778*    (2022.01)
*G06V 10/764*    (2022.01)
*G06V 10/774*    (2022.01)

(52) U.S. Cl.
CPC ........ *G06V 10/7792* (2022.01); *G06V 10/764* (2022.01); *G06V 10/774* (2022.01)

(58) Field of Classification Search
CPC . G06V 10/7792; G06V 10/774; G06V 10/764
See application file for complete search history.

(56) References Cited

U.S. PATENT DOCUMENTS 11,615,314 B2 *   3/2023   Lee ................. G06F 18/214
                                                 706/25
12,026,974 B2 *   7/2024   Zhao ............... G06F 18/214
                   (Continued)

FOREIGN PATENT DOCUMENTS

WO    WO-2023038574 A1 *   3/2023   ............ G06T 7/11
WO    WO-2023167736 A1 *   9/2023   .......... G06N 3/0464
WO    WO-2023213865 A1 *  11/2023   ............ G06V 10/82

OTHER PUBLICATIONS

Cai et al., "Exploring Object Relation in Mean Teacher for Cross-Domain Detection" arXiv:1904.11245v2 [cs.CV], 10 pages, dated Dec. 25, 2019.

(Continued)

*Primary Examiner* — Manav Seth
(74) *Attorney, Agent, or Firm* — HANLEY, FLIGHT & ZIMMERMAN, LLC (57) ABSTRACT

Implementations are described herein for improving unsupervised domain adaptation (UDA) by using improved adaptive teacher for object detection with cross-domain mix-up. In various implementations, cross-domain training of an object detection machine learning model may include: performing weak augmentation on images from a target domain $D_T$ to generate a first set of weakly augmented target domain images; perform strong augmentation on images from the source domain $D_S$ and images from the target domain $D_T$ to generate a second set of strongly augmented images; processing the second set of strongly augmented images to generate a third set of inter-domain mixes of the images from $D_S$ and $D_T$; and jointly train the object detection machine learning model, as a student machine learning model, with a teacher machine learning model using the first and third sets.

20 Claims, 5 Drawing Sheets

(56) References Cited

U.S. PATENT DOCUMENTS

| | | | |
|---|---|---|---|
| 12,147,766 B2* | 11/2024 | Fu | G06T 7/11 |
| 12,374,096 B2* | 7/2025 | Wasnik | G06V 10/82 |
| 12,417,559 B2* | 9/2025 | Hinz | G06T 11/00 |
| 2021/0374553 A1* | 12/2021 | Li | G06N 3/088 |
| 2022/0083840 A1* | 3/2022 | Luong | G06N 3/088 |
| 2022/0180193 A1* | 6/2022 | Caine | G06N 3/08 |
| 2023/0053716 A1* | 2/2023 | Weinzaepfel | G06N 3/04 |
| 2023/0152465 A1* | 5/2023 | Kong | G06T 7/11 356/5.01 |
| 2023/0154167 A1* | 5/2023 | Li | G06T 7/73 382/159 |
| 2023/0297653 A1* | 9/2023 | Das | G06F 21/32 726/18 |
| 2023/0401829 A1* | 12/2023 | Liu | G06V 10/762 |
| 2024/0177456 A1* | 5/2024 | Chondro | G06V 20/70 |
| 2024/0220848 A1* | 7/2024 | Mahmud | G06N 20/00 |
| 2025/0271857 A1* | 8/2025 | Burnley | G05D 1/0088 |
| 2025/0285454 A1* | 9/2025 | Wang | G06V 10/26 |

OTHER PUBLICATIONS

Li et al., "Cross-Domain Adaptive Teacher for Object Detection" 10 pages, dated 2021.

Ganin et al., "Unsupervised Domain Adaptation by Backpropagation" arXiv:1409.7495v2 [stat.ML], 11 pages, dated Feb. 27, 2015.

Zhang et al., "Multi-Class Object Detection using Faster R-CNN and Estimation of Shaking Locations for Automated Shake-and-Catch Apple Harvesting" Retrieved from https://www.sciencedirect.com/science/article/pii/S0168169919327073, 13 pages, dated 2020.

Cascante-Bonilla et al. "Curriculum Labeling: Revisiting Pseudo-Labeling for Semi-Supervised Learning" AAAI Conference on Artificial Intelligence. 9 pages, dated 2021.

Zhang et al., "Bag of Freebies for Training Object Detection Neural Networks" arXiv:1902.04103v3 [cs.CV], 9 pages, dated Apr. 12, 2019.

Sohn et al., "FixMatch: Simplifying Semi-Supervised Learning with Consistency and Confidence" 34th Conference on Neural Information Processing Systems. 21 pages, dated 2020.

Tarvainen et al., "Mean teachers are better role models: Weight-averaged consistency targets improve semi-supervised deep learning results" 31st Conference on Neural Information Processing Systems, 10 pages, dated 2017.

Van Gool et al. "The Pascal Visual Object Classes (VOC) Challenge", International Journal of Computer Vision, vol. 88, No. 2, pp. 303-338. https://doi.org/10.1007/s11263-009-0275-4, dated 2010.

De Vries et al., "Improved Regularization of Convolutional Neural Networks with Cutout" arXiv:1708.04552v2 [cs.CV], 8 pages, dated Nov. 29, 2017.

Liu et al., "Unbiased Teacher for Semi-Supervised Object Detection" arXiv:2102.09480v1 [cs.CV], 17 pages, dated Feb. 18, 2021.

Arazo et al., "Pseudo-Labeling and Confirmation Bias in Deep Semi-Supervised Learning" arXiv:1908.02983v5 [cs.CV], 8 pages, dated Jun. 29, 2020.

Zhang et al., "mixup: Beyond Empirical Risk Minimization" arXiv:1710.09412v2 [cs.LG] 13 pages, dated Apr. 27, 2018.

Rizve et al., "In Defense of Pseudo-Labeling: An Uncertainty-Aware Pseudo-Label Selection Framework for Semi-Supervised Learning" arXiv:2101.06329v3 [cs.LG] 20 pages, dated Apr. 19, 2021.

* cited by examiner

Fig. 1
(WARMUP)

Fig. 2 (ADAPTATION)

OBJECT DETECTION WITH CROSS-DOMAIN MIXING

BACKGROUND

Deploying object detection machine learning models at scale can be challenging due to, among other things, large domain shifts between applications and use cases. For instance, it is difficult to train object detection machine learning models to be able to generalize across disparate domains because of changes in appearances of objects and/or environments, such as lighting changes, weather changes, location changes, etc. As one example, autonomous driving agents that perform well in clear daylight may struggle greatly in adverse weather such as heavy fog. Although collecting additional ground truth labels of a target domain can help with cross-domain learning, doing so for each and every domain and/or scenario may not be scalable.

SUMMARY

Unsupervised domain adaptation (UDA) offers a promising approach to systematically tackle such problems of data and scale. UDA aims to leverage data from a label-rich source domain to improve the performance on a label-poor target domain by reducing the domain gap and/or learning domain-invariant features. For example, mean teacher distillation provides a promising framework to leverage state-of-the-art semi-supervised and unsupervised learning techniques for cross domain adaptation. However, training models across domains remains challenging due to factors such as the absence of target domain labels, bias towards the source domain, and pseudo label noise.

Implementations are described herein for improving unsupervised domain adaptation (UDA) by using an improved adaptive teacher for object detection with cross-domain mix-up. In various implementations, a method for performing cross-domain training of an object detection machine learning model may be implemented using processor(s) and may include: performing weak augmentation on images from a target domain $D_T$ to generate a first set of weakly augmented target domain images; performing strong augmentation on images from the source domain $D_S$ and images from the target domain $D_T$ to generate a second set of strongly augmented images; processing the second set of strongly-augmented images to generate a third set of inter-domain mixes of the images from $D_S$ and $D_T$; and jointly training the object detection machine learning model, as a student machine learning model, with a teacher machine learning model using the first and third sets.

In various implementations, the method may include processing images from the second set to generate a fourth set of intra-domain mixes of the images from $D_S$. In various implementations, the object detection machine learning model may be further trained using the fourth set.

In various implementations, the joint training may include updating weights of the teacher machine learning model based on an exponential moving average of weights of the object detection model. In various implementations, output generated using the teacher machine learning model may include pseudo labels that are used to train the object detection machine learning model.

In various implementations, the method may further include performing adversarial training of the object detection machine learning model and a discriminator machine learning model, including applying the discriminator machine learning model to a feature embedding generated by the object detection machine learning model to generate a predicted classification of the feature embedding as being in the source or target domain. In various implementations, the object detection machine learning model may include a feature encoder, a region proposal network (RPN), and a region of interest (ROI) pooling layer.

In a related aspect, a method for performing cross-domain training of an object detection machine learning model may include: performing strong augmentation on images from a source domain $D_S$ and images from a target domain $D_T$ to generate a first set of strongly augmented source domain images and a second set of strongly augmented target domain images; mixing images from the first set of strongly augmented source domain images with images from the second set of strongly augmented target domain images to generate a third set of inter-domain mixed images of the images from $D_S$ and $D_T$; processing images from the first or second sets to generate a fourth set of intra-domain mixed images from $D_S$ or $D_T$; and jointly training the object detection machine learning model, as a student machine learning model, with a teacher machine learning model using the third and fourth sets.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations are described herein for performing cross-domain training of an object detection machine learning model, such that the model can be used to perform object detection in new and different domains. In the agricultural domain, for instance, a phenotyping machine learning model may be well trained to detect particular plant types and/or phenotypic traits during daylight conditions, but less so during the night or on cloudy, foggy, or rainy days. Techniques described herein may be implemented to adapt the phenotyping machine learning model to be able to detect those traits in different conditions. Techniques described herein may also be used to adapt a phenotyping machine learning model trained to detect one phenotypic trait for which labels are available to detect other phenotypic traits for which labels are scarce.

In some implementations, techniques described herein are implemented using a cross-domain mean teacher (CD-MT) framework. This framework may include a dual teacher-student distillation structure where a teacher machine learning model is usually a better, stronger (e.g., more parameters) model that can generate high quality "targets" (e.g. pseudo labels) for a student machine learning model to mimic. This is the "teacher" part in CD-MT.

When the target data is fully or mostly unlabeled, which is the case for semi-supervised learning and unsupervised domain adaptation, it may be challenging or even infeasible to obtain a sufficient teacher machine learning model from the outset. Accordingly, in various implementations, the teacher machine learning model may be initialized and continually updated with an exponential moving average (EMA) of weights the student machine learning model. This way, the student machine learning model benefits from the guidance of higher-quality targets through EMA, a form of model ensembling, which may yield high improved generalization. Additionally, the teacher machine learning model benefits from continuous updates during training. Such mutual or joint learning is a form of self-supervision and is the "mean" part in CD-MT. In addition, this continual update of the teacher machine learning model also helps with gradual adaptation when domain shift exists, since both models can be improved over time.

The "cross-domain" aspect of CD-MT refers to the adaptation process. Firstly, since the target domain data is unlabeled in unsupervised domain adaptation, the teacher machine learning model may be used to generate pseudo labels to guide the student machine learning model's learning for target domain features. Secondly, CD-MT methods may leverage some domain-aware modules to better handle domain shift. For example, unbiased mean teacher techniques use CycleGAN as a domain translation method to generate synthetic images that resemble the styles of source and target domain to reduce the domain gap and bias in their models. Adaptive teacher, on the other hand, uses adversarial learning in the form of a domain discriminator to encourage the learning of domain-invariant features.

With various techniques described herein, a mixed-domain teacher framework may be provided that leverages a two-stage, joint intra-domain and inter-domain mix-up augmentation. Intra-domain mixing can encourage better generalization and improve robustness on unseen data, which may indirectly benefit the target domain. Inter-domain mixing may reduce the domain gap between source and target domains, and encourage learning of not only domain-invariant features, but also direct linear behavior toward the target domain's distribution.

Figure 1:
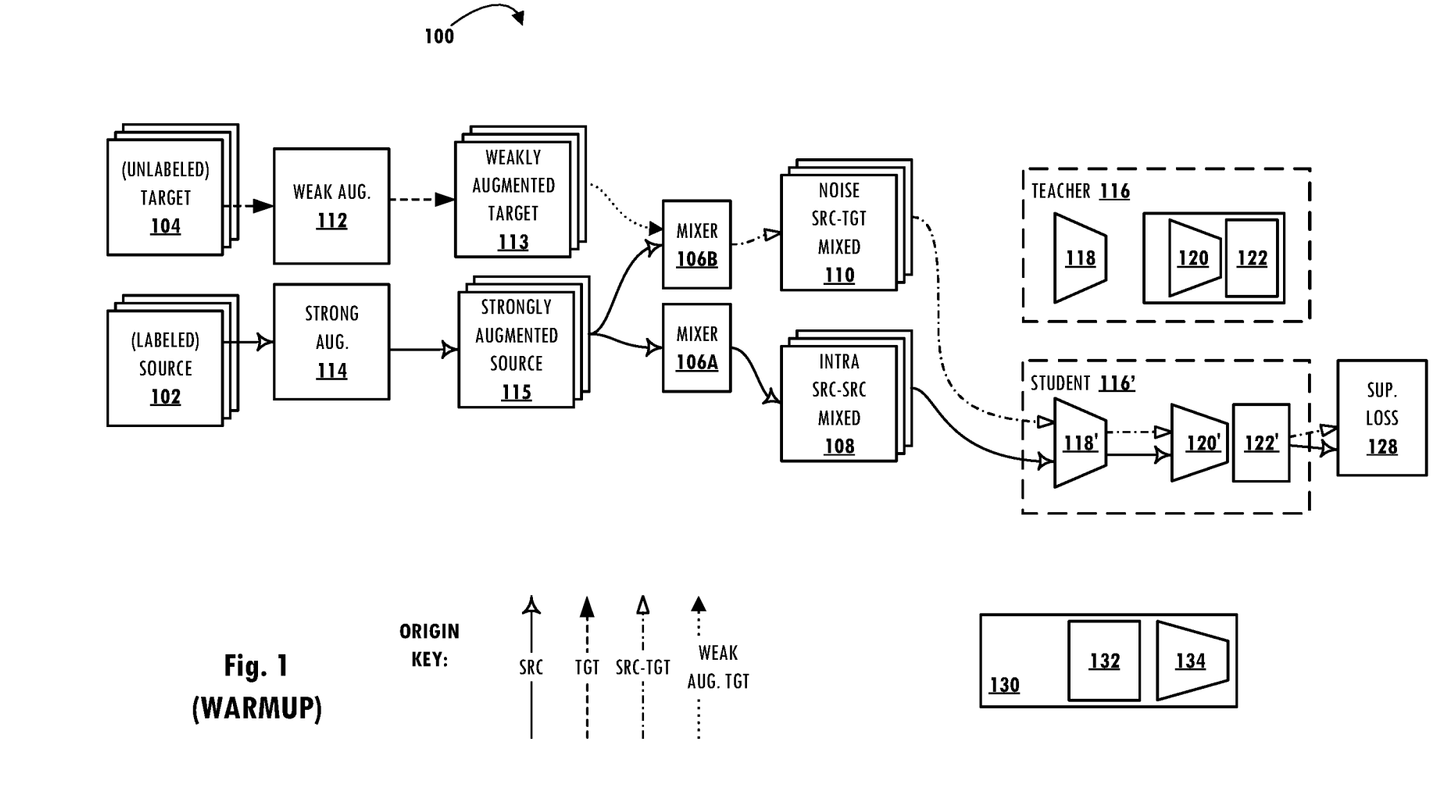
FIG. 1 schematically depicts an example mixed-domain teacher framework and how it may be utilized during a warmup phase of cross-domain training.
Figure 2:
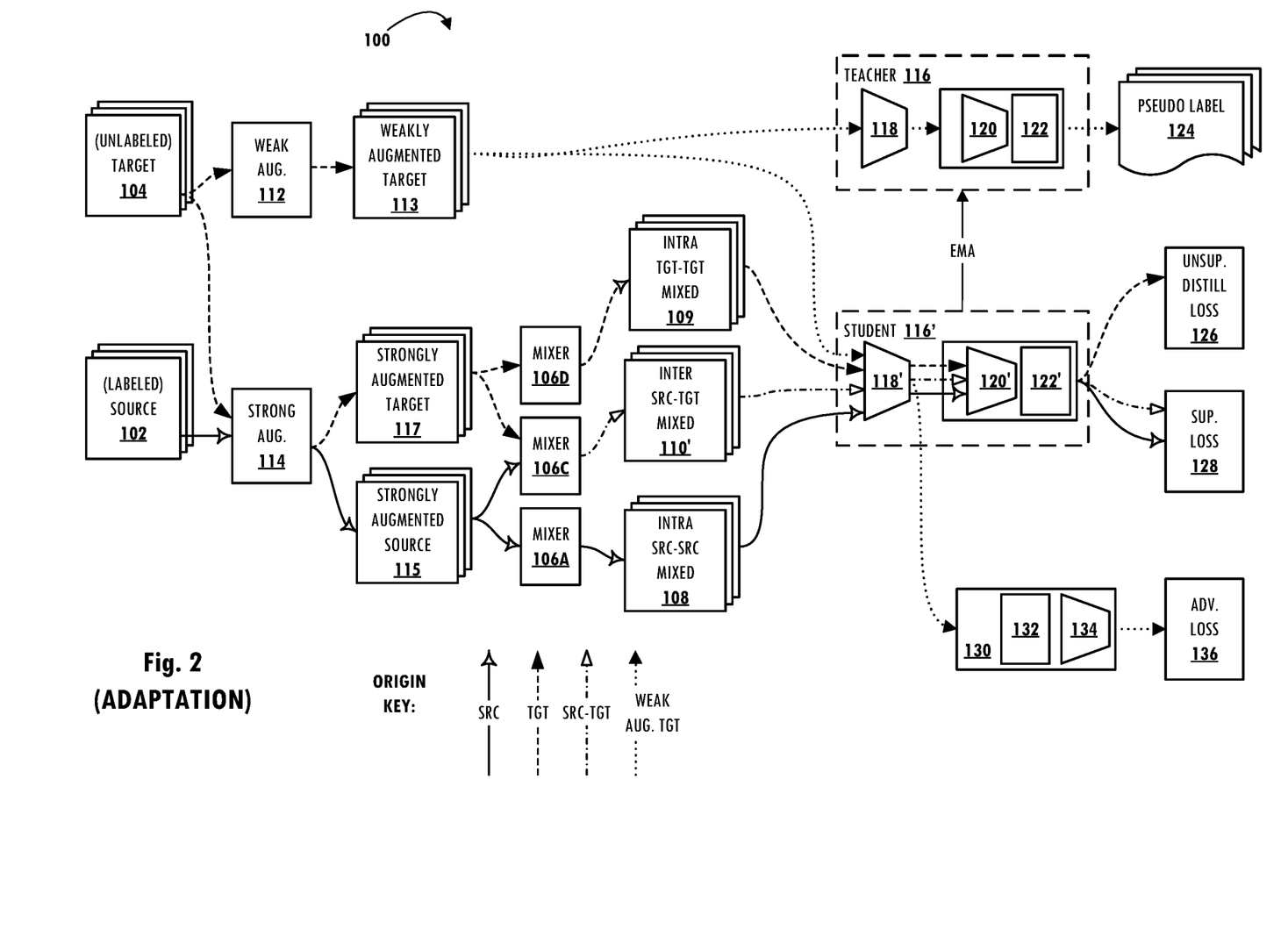
FIG. 2 schematically depicts an example of how the example mixed-domain teacher framework may be utilized during a adaptation phase of cross-domain training.

In various implementations, a warmup phase and an adaptation phase may be implemented to perform cross-domain training of an object detection machine learning model. FIGS. 1 and 2 depict an example mixed-domain teacher framework 100 for implementing selected aspects of the present disclosure, during both warmup (FIG. 1) and adaptation (FIG. 2) phases. In various implementations, the mixed-domain teacher framework 100 may include a teacher machine learning model 116 and a student machine learning model 116' (which may alternatively be referred to as an "object detection machine learning model"). In various implementations, the student machine learning model 116' may be trained as described herein.

FIG. 1 schematically depicts one example of how the warmup phase may be implemented. As shown in the "origin key" at bottom (which is the same in FIG. 2), solid lined arrows with white tips represent data that originated at labeled source (SRC) images 102. Dashed line arrows with solid black tips represent data that originated at unlabeled target (TGT) images 104. Arrows with white tips and dash-dot-dash lines represent mixed data that originated from both labeled source domain images 102 and unlabeled target domain images 104. The black-tipped arrows formed with dotted lines (not dashes) represent weakly augmented data that originated at unlabeled target domain images 104.

Starting at left, labeled source domain images 102 and unlabeled target domain images 104 may be processed by a weak augmentation module 112 and/or a strong augmentation module 114, either which may be implemented using any combination of hardware and software. Weak augmentation module 112 may perform operations on the images such as horizonal flipping, cropping, etc., and output weakly augmented images. In FIG. 1, for instance, weak augmentation module 112 processes unlabeled target domain images 104 to generate weakly augmented target images 113. Strong augmentation module 114 may perform operations on the images such as color jittering, gray scaling, blurring, and/or cutout, to name a few to generate strongly augmented images. In FIG. 1, strong augmentation module 114 processes labeled source domain images 102 to generate strongly augmented source images 115.

The strongly augmented source images 115 may be processed during a first iteration of a mixer 106A (which may be implemented using any combination of hardware and software) to generate intra-domain (SRC-SRC) mixed images 108 of source domain images 102. For example, an object depicted in a first source domain image 102 may be blended, superimposed, overlaid, or otherwise incorporated with another source domain image 102 to generate an intra-domain mixed image 108.

Additionally, a second iteration of mixer 106B (the mixer and/or the machine learning parameters it applies may remain constant across iterations, i.e. mixer 106A may be the same as mixer 106B, just applied at different times to different data) may process both weakly augmented target images 113 and strongly augmented source images 115 to generate, e.g., as "noise," inter-domain (SRC-TGT) mixed images 110. For example, an object depicted in a target domain image 104 may be blended, superimposed, overlaid, or otherwise incorporated with a source domain image 102 to generate an inter-domain mixed image 110. At this stage, the target domain object may be lightly incorporated relative to the source objects (e.g. the target object may appear much fainter and/or more translucent than the source object) such that it effectively adds noise.

The intra-domain mixed images 108 and inter-domain mixed images 110 may be processed by object detection (student) machine learning model 116' to generate a supervised loss 128. Student machine learning model 116' includes a feature encoder 118', a region proposal network (RPN) 120', and a region of interest (ROI) pooling layer 122' that are used to process these data. Supervised loss 128 is determined from the labeled source domain images 102 (the labels may be propagated to the mixed images as applicable). The operations performed by mixer 106A-B in FIG. 1 may encourage object detection (student) machine learning model 116' to learn linear behaviors to reduce the domain gap and bridge between the source and target domain distributions.

In some implementations, the supervised detection loss used during the warmup phase can be expressed as follows:

$$\mathcal{L}_{det}(X^S, Y^S) = \mathcal{L}_{rpn}(X^S, Y^S) + \mathcal{L}_{roi}(X^S, Y^S) \quad (1)$$
$$= \mathcal{L}_{cls}^{rpn}(X^S, Y^S) + \mathcal{L}_{reg}^{rpn}(X^S, Y^S)$$
$$+ \mathcal{L}_{cls}^{roi}(X^S, Y^S) + \mathcal{L}_{reg}^{roi}(X^S, Y^S)$$

$\mathcal{L}$ denotes the loss of RPN 120' which generates candidate proposal(s). $\mathcal{L}_{roi}$ denotes the loss for the ROI pooling layer 122'. Both RPN 120' and ROI layer 122' may perform bounding box regression and classification tasks, such as binary classification for RPM (e.g., "object" or "no object") and/or multi-class classification.

FIG. 2 schematically depicts the adaptation phase. First, the general framework of FIG. 2 will be described. Then, more details about how each component operates will be explained. Many of the components of FIG. 2 correspond to components of FIG. 1, which were described previously.

Starting at left in FIG. 2, labeled source domain images 102 and unlabeled target domain images 104 are processed by strong augmentation module 114 to generate both strongly augmented target images 117 and strongly augmented source images 115. Unlabeled target domain images 104 are also processed by weak augmentation module 114 to generate weakly augmented target images 113. Unlike during the warmup phase, during the adaptation phase, the weakly augmented target images 113 generated by weak augmentation module 112 are processed by teacher machine learning model 116. In some implementations, like student machine learning model 116', teacher machine learning model 116 includes a feature encoder 118, a RPN 120, and a ROI pooling layer 122 that are used to process the augmented mixes. This process generates pseudo labels 124.

The strongly augmented images 115, 117 generated by strong augmentation module 114 may be processed by mixer 106 in multiple iterations (106A, 106C, 106D) to generate various mixed images. For example, a first iteration of mixer 106A may process strongly augmented source images 115 to generate intra-domain (SRC-SRC) mixed images 108, similar to during the warmup phase depicted in FIG. 1 (which is why the same reference number 106A is used again). A third iteration of mixer 106C may process both strongly augmented source images 115 and strongly augmented target images 117 to generate inter-domain (SRC-TGT) mixed images 110'. Unlike the inter-domain mixed images 110 generated during warmup, during adaptation, the inter-domain mixed images 110' may be more balanced. For example, the source and target objects may be blended into the mixed image more-or-less equally so that they appear at similar levels of faintness, translucence, etc. A fourth iteration of mixer 106D may process strongly augmented target images 117 to generate intra-domain (TGT-TGT) mixed images 109.

The intra-domain (SRC-SRC) mixed images 108, intra-domain (TGT-TGT) mixed images 109, inter-domain (SRC-TGT) mixed images 110', and weakly augmented target images 113 may be processed using object recognition (student) machine learning model 116' to generate various losses, among other things. In FIG. 2, for instance, and as indicated by the arrows, an unsupervised distillation loss 126 is generated based on data that originated from the unlabeled target domain images 104. Also as indicated by the arrows, supervised loss 128 is generated based on data that originated from labeled source domain images 102 and inter-domain (SRC-TGT) mixed images 110'.

The pseudo labels 124 generated by teacher machine learning model 116 may be used (e.g., during third and fourth iterations of mixer 106C-D) to guide the training of object recognition (student) machine learning model 116' during the adaptation phase (and/or the warmup phase in some instances). Additionally, and as shown in FIG. 2, in some implementations, weights of the teacher machine learning model 116 may be iteratively updated based on an EMA of weights of the object detection model. Taken together, unsupervised distillation loss 126 and/or supervised loss 128 may be determined based on this teacher-student training and used to train object detection (student) machine learning model 116'.

In some implementations, an adversarial training pipeline 130 also may be implemented during adaptation, e.g., to process data that originated at weakly augmented target images 113 to generate adversarial domain discovery loss 136. As depicted at bottom in FIG. 2, adversarial machine learning pipeline 130 may include a gradient reverse layer (GRL) 132 and a discriminator machine learning model 134. Discriminator machine learning model 134 may be trained to classify feature embeddings generated by feature encoder 118' of object detection (student) machine learning model 116' as being either from the source domain or from the target domain. By performing adversarial training between object detection (student) machine learning model 116' and discriminator machine learning model 134 using adversarial domain discovery loss 136, object detection (student) machine learning model 116' is encouraged to learn domain invariant features.

In some implementations, beside supervised learning with labeled source data, three additional tasks may be performed during the adaptation phase depicted in FIG. 2: (i) knowledge distillation using teacher-generated pseudo labels; (ii) periodic exponential moving average update of the teacher; and (iii) domain alignment via adversarial learning.

Knowledge Distillation Using Teacher-Generated Pseudo Labels

The lack of target domain annotations may be addressed by leveraging the teacher machine learning model 116 to generate pseudo labels 124 of target domain images. Given sufficient warmup, it becomes reasonable to expect the predictions of teacher machine learning model 116 to serve as helpful guidance for student machine learning model 116' to mimic. To further control and reduce pseudo labeling noise, in some implementations, a confidence threshold (e.g. 0.8) may be used to remove low-quality, false-positive bounding boxes. This knowledge distillation loss can be described using an equation such as the following:

$$\mathcal{L}_{KD}(X_s, \widehat{Y_s}) = \mathcal{L}_{rpn}(X_s, \hat{Y}_s) + \mathcal{L}_{roi}(X_s, \widehat{Y_s}) \quad (2)$$

$\hat{Y}_s$ denotes the pseudo labels 124 generated by teacher machine learning model 116. In some implementations, pseudo labels 124 may include predicted bounding box coordinates and object classes. Strong-weak augmentation may be used as well. For example, weak perturbations such as horizontal flipping and/or cropping may be applied by weak augmentation module 112 to the target domain input of teacher machine learning model 116 to ensure more reliable pseudo labels. Strong augmentations such as color jittering, grayscaling, blurring, and/or cutout, may be applied by strong augmentation module 114 to the input(s) processed by student machine learning model 116' to encourage robustness against appearance changes.

Periodic Exponential Moving Average (EMA) Update of the Teacher

In various implementations, EMA may be applied at all or selected training steps to periodically update teacher machine learning model 116 using the learnable parameters of student machine learning model 116', e.g., in accordance with the following equation:

$$\theta_{teacher} \leftarrow \alpha\theta_{teacher} + (1-\alpha)\theta_{student} \quad (3)$$

EMA is a method of self-ensembling that allows teacher machine learning model 116 to be more robust to outliers and have better generalization, facilitating high-quality pseudo labels 124. In the context of domain adaptation, as student machine learning model 116' gradually adapts to the target domain's distribution through both the use of pseudo labels 124 and other adaptation methods—e.g. adversarial learning, domain-aware augmentation, etc.—the periodic updates allow teacher machine learning model 116 to undergo performance gain(s) and improve over time along with student machine learning model 116'.

Domain Alignment Via Adversarial Learning

As mentioned previously, in various implementations, a small, auxiliary domain discriminator (or classifier) model D (134 in FIG. 2) may be provided to compete with the object detection model/student machine learning model 116' in a min-max optimization. For example, discriminator 134 may be used to process the feature embedding of object detection model/student machine learning model 116' in order to classify whether the feature embedding is from a source domain image (e.g., 102) or target domain image (e.g., 104), e.g., to generate adversarial domain discovery loss 136. Object detection model/student machine learning model 116' on the other hand may be applied in order to attempt to fool discriminator 134. By letting object detection model/student machine learning model 116' compete with discriminator 134, object detection model/student machine learning model 116' can be encouraged to learn more domain-invariant features, which is beneficial for handling the domain gap when detecting objects from the target domain.

Let E(X) be the embedding feature of input image X, p(E(X)) denote the probability of it belonging to the target domain, and d be the binary domain label: d=1 if target, d=0 if source. The binary cross entropy loss of the domain discriminator may be expressed as follows:

$$\mathcal{L}_{disc} = -d\log p(E(X_t)) - (1-d)\log(1-p(E(X_s))) \quad (4)$$

In some implementations, gradient reverse layer (GRL) 132 may be used to simplify the joint training of object detection model/student machine learning model 116' and domain discriminator 134.

Turning to the operations performed by mixer 106 in more detail, in various implementations, it may be beneficial to bias student machine learning model 116' towards simpler, linear behaviors on unseen examples by enforcing the constraint that a convex combination of the inputs (e.g., a mixed image) should yield a corresponding convex combination of one-hot labels (e.g., mixed class probabilities). This notion is set forth in equations (5) and (6) below:

$$\tilde{x} = \lambda x_i + (1-\alpha)x_j \quad (5)$$

$$\tilde{y} = \lambda \mathcal{Y}_i + (1-\lambda)\mathcal{Y}_j \quad (6)$$

$x_i$, $x_j$ may be raw input vectors and $y_i$, $y_j$ may be one-hot label encodings. It has been suggested that this can reduce undesirable oscillations when predicting out-of-domain examples and leads to decision boundaries that transition linearly from class to class, providing a smoother estimate of uncertainty. However, this liner interpolation may be applicable to a limited number of y (e.g., one-hot embedding of classification labels). For other general tasks, like detection, it may be beneficial to regress to certain coordinates besides the classification task. Interpolating the coordinates to obtain new coordinates may not make sense because the boundary of the object does not change after the mixing of input images. Accordingly, in various implementations, what is referred to herein as "Generalized Vicinal Risk Minimization" (GVRM) may be used as a more generalized version of Vicinal Risk Minimization (VRM), and may be characterized by the following equations:

$$\tilde{x} = \lambda x_i + (1-\lambda)x_j \quad (7)$$

$$\mathcal{L}_{\tilde{x}} = \lambda \mathcal{L}_{x_i} + (1-\lambda)\mathcal{L}_{x_j} \quad (8)$$

One difference between GVRM and VRM is that instead of interpolating y, the loss $\mathcal{L}$ is interpolated directly. Intuitively, the loss $\mathcal{L}$ is reweighted according to the intensity of the signal after mixing the input. As an example, for detection task with $\lambda=0.7$, the signal or information from $x_i$ and $x_j$ are 70% and 30% respectively, thus both classification loss and regression loss will be re-weighted accordingly.

VRM may be shown to be a special case of GVRM when the loss for classification is cross-entropy, as set forth below:

$$\mathcal{L}_{CE}(X_m, (\lambda Y_1 + (1-\lambda)Y_2)) \quad (9)$$

$$= -(\lambda Y_1 + (1-\lambda)Y_2)\log p(X_m; \theta) \quad (10)$$

$$= -\lambda Y_1 \log p_\theta(X_m) - (1-\lambda)Y_2 \log p_\theta(X_m) \quad (11)$$

$$= \lambda \mathcal{L}_{CE}(X_m, Y_1) + (1-\lambda)\mathcal{L}_{CE}(X_m, Y_2) \quad (12)$$

Given the extension of mixing to object detection as described above, a two-stage, holistic domain mixing strategy is provided herein for mean teacher learning. The mixed-domain teacher machine learning model 116 may be considered "holistic" in the sense that it leverages the joint mixing of both intra-domain and inter-domain data to simultaneously tackle the challenges of missing object ground truths, bias toward source domain, and pseudo label noise. Moreover, two different mixing strategies are designed for the warmup and adaptation stages.

As described previously, during the warmup phase, intra-source domain data was mixed to encourage improved (e.g., non-directional) generalization and improved robustness on unseen data. Thus, the warmup stage initialized teacher machine learning model 116, which in turn will generate pseudo labels 124 during the adaptation phase to distill target-domain knowledge to student machine learning model 116'. However, a warmup stage that relies purely on source domain data risks biasing teacher machine learning model 116 model toward such a distribution, potentially yielding low-quality pseudo labels 124.

Accordingly, in various implementations, during warmup, unlabeled target domain images 104 may be leveraged to mitigate this, e.g., by mixer 106 mixing a small amount (e.g. $\lambda<0.1$) of the unlabeled target images (e.g., weakly augmented target domain images 113) into the labeled source images. As a result, these images will behave as inter-domain, target-aware noise augmentation that may help reduce domain gap and bias in teacher machine learning model 116. Unlike intra-domain mixing (SRC-SRC, TGT-TGT), such an inter-domain augmentation (SRC-TGT) acts as a directional prior that directly encourages teacher machine learning model 116 to learn linear behaviors to reduce the domain gap and bridge from source to target distribution.

As described previously and shown in FIG. 2, during the adaptation phase, and leveraging the pseudo labels 124 generated by teacher machine learning model 116, mixer 106 (particularly iterations 106C and 106D) may perform intra-domain mixing with both labeled source (source-source) and pseudo labeled target data (target-target). Moreover, version of inter-domain mixing may also be deployed by mixer 106, similar to what used in the warmup phase, but in a more balanced fashion. The reasons for this are twofold. First, with the presence of target pseudo labels 124, there is the option to perform inter-domain mixing in the same manner as was done for intra-domain labeled source mixing. Second, continuing to use noise mixing may become merely additional source domain data (the mixed-in unlabeled target image is only noise) and can potentially bias the model toward source distribution. Compared to this, pseudo labels 124 are a stronger signal that may push student machine learning model 116' to learn target domain features. During the adaptation phrase, balanced mixing may be applied by mixer 106 for source-target pairs by sampling lambda from an unbiased distribution, e.g. Beta$\{\alpha, \alpha\}$ or $\{0.5\}$, i.e., fixed lambda.

Figure 3:
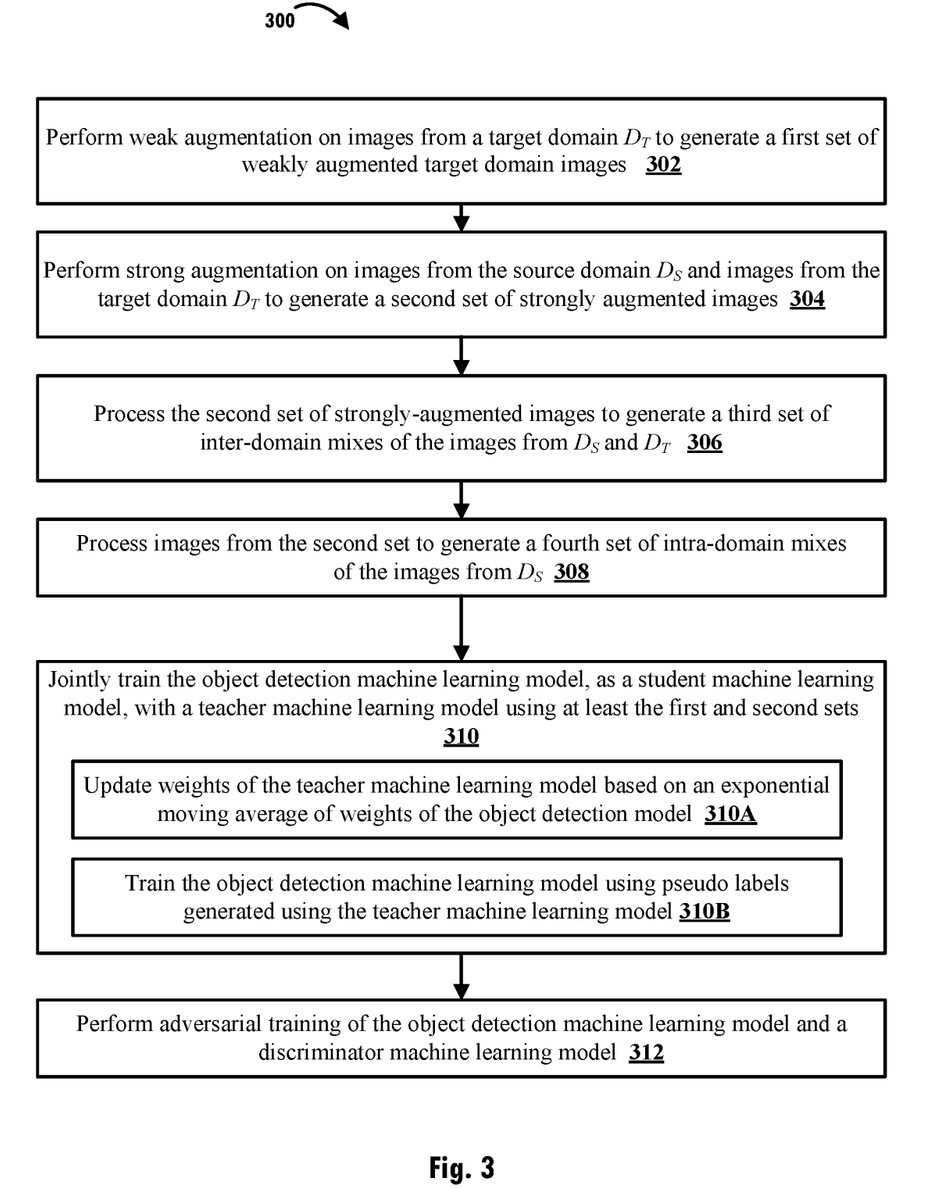
FIG. 3 schematically depicts an example method of carrying out selected aspects of the present disclosure.

FIG. 3 is a flow chart demonstrating an example method 300 for practicing selected aspects of the present disclosure, in accordance with various implementations. For convenience, the operations of the flow chart are described with reference to a system that performs the operations. This system may include various components of various computer systems. Moreover, while operations of method 300 are shown in a particular order, this is not meant to be limiting. One or more operations may be reordered, omitted or added.

At block 302, the system, e.g., by way of weak augmentation module 112, may perform weak augmentation on images 104 from a target domain $D_T$ to generate a first set (e.g., 113 in FIG. 1 or 2) of weakly augmented target domain images. At block 304, the system, e.g., by way of strong augmentation module 114, may perform strong augmentation on images 102 from the source domain $D_S$ and images 104 from the target domain $D_T$ to generate a second set (e.g., 115 and/or 117 in FIG. 2) of strongly augmented images. The second set may include, for instance, strongly augmented source domain images 115 and/or strongly augmented target domain images 117.

At block 306, the system, e.g., by way of mixer 106 (e.g., iteration 106C), may process and/or mix images from the second set (e.g., 115 and/or 117) of strongly augmented images to generate a third set (e.g., 110, 110') of inter-domain mixes of the images from $D_S$ and $D_T$. At block 308, the system, e.g., by way of mixer 106 (e.g., iteration 106A and/or 106D), may process and/or mix images from the second set (e.g., 115 and/or 117) to generate a fourth set (e.g., 108 and/or 109) of intra-domain mixes of the images from DS. Intra-domain mixes may include, for instance, fused images from the same domain. The fourth set may include, for instance, intra-domain (SRC-SRC) mixed images 108 and/or intra-domain (TGT-TGT) mixed images 109.

At block 310, the system may jointly train an object detection machine learning model, as a student machine learning model (e.g., 116'), with a teacher machine learning model (e.g., 116) using the first and third sets, and the fourth set if available. In some implementations, the joint training of block 310 may include, at block 310A, updating weights of the teacher machine learning model based on an EMA of weights of the object detection model. Additionally or alternatively, at block 310B, the system may train the object detection machine learning model/student (116') using pseudo labels (124) generated using the teacher machine learning model (116). In some implementations, at block 312, the system may perform adversarial training of the object detection machine learning model (e.g., 116') and a discriminator machine learning model (e.g., 134) using an equation such as (4) as described previously.

Figure 4:
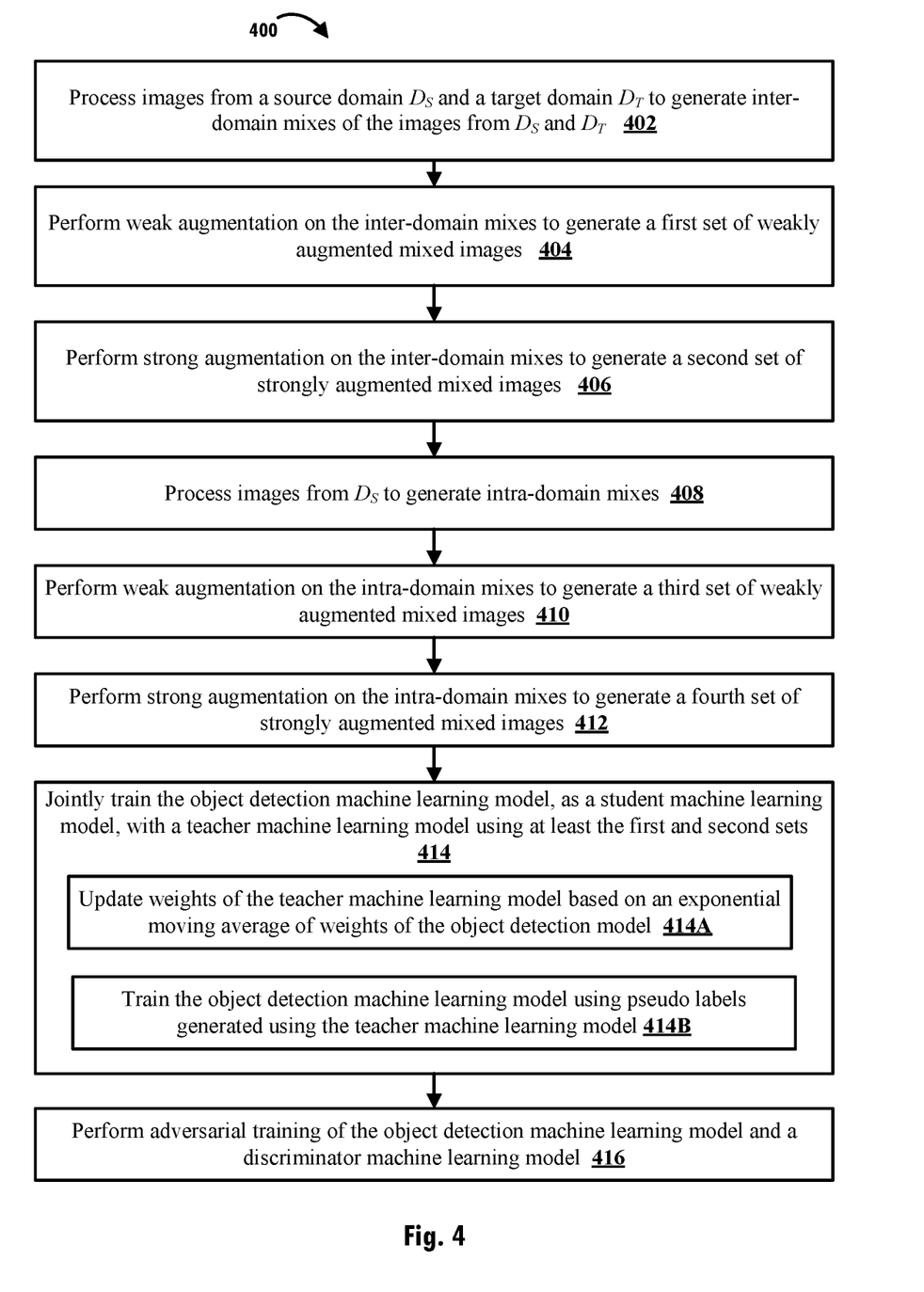
FIG. 4 schematically depicts another example method of carrying out selected aspects of the present disclosure.

FIG. 4 is a flow chart demonstrating an example method 400 for practicing selected aspects of the present disclosure, in accordance with various implementations. For convenience, the operations of the flow chart are described with reference to a system that performs the operations. This system may include various components of various computer systems. Moreover, while operations of method 400 are shown in a particular order, this is not meant to be limiting. One or more operations may be reordered, omitted or added. The operations of method 400 are similar to those of method 300, except various operations have been reordered.

At block 402, the system, e.g., by way of mixer 106, may process (e.g., mix) images (102) from a source domain $D_S$ (102) and images (104) from a target domain $D_T$ to generate inter-domain mixes (110) of the images from $D_S$ and $D_T$. At block 404, the system, e.g., by way of weak augmentation module 112, may perform weak augmentation on the inter-domain mixes (110) to generate a first set of weakly augmented mixed images.

At block 406, the system, e.g., by way of strong augmentation module 114, may perform strong augmentation on the inter-domain mixes (110) to generate a second set of strongly augmented mixed images. At block 408, the system, e.g., by way of mixer 106, may process images from $D_S$ to generate intra-domain mixed images (108). At block 410, the system, e.g., by way of weak augmentation module 112, may perform weak augmentation on the intra-domain mixed images (108) to generate a third set of weakly augmented mixed images. At block 412, the system, e.g., by way of strong augmentation module 114, may perform strong augmentation on the intra-domain mixes to generate a fourth set of strongly augmented mixed images.

At block 414, the system may jointly train the object detection machine learning model, as a student machine learning model (e.g., 116'), with a teacher machine learning model (e.g., 116) using at least the first and second sets, and the third and fourth sets if available. In some implementations, at block 414A, the system may update weights of the teacher machine learning model (e.g., 116) based on an EMA of weights of the student machine learning model (e.g., 116'), as shown in FIG. 2. In some implementations, at block 414B, the system may train the object detection machine learning model/student (116') using pseudo labels (124) generated using the teacher machine learning model (116). In some implementations, at block 416, the system may perform adversarial training of the object detection machine learning model (e.g., 116') and a discriminator machine learning model (e.g., 134) using an equation such as (4) as described previously.

Figure 5:
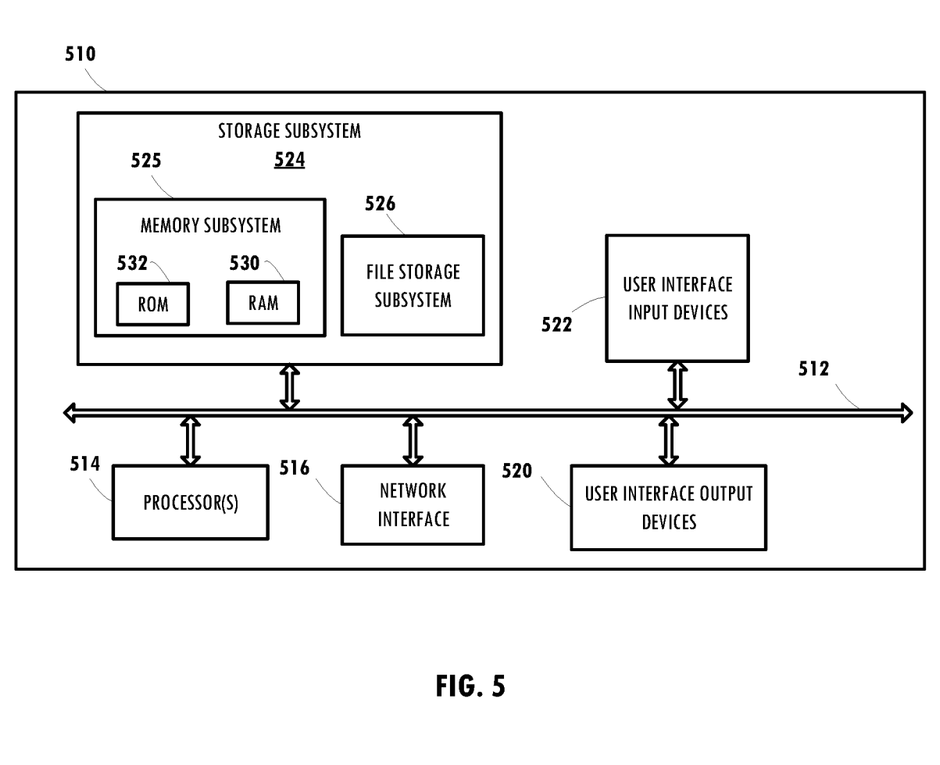
FIG. 5 schematically depicts an example computer architecture for carrying out selected aspects of the present disclosure.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIG. 3-4, as well as to implement various components depicted in FIGS. 1-2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for performing cross-domain training of an object detection machine learning model, the method implemented using one or more processors, comprising:
performing weak augmentation on images from a target domain (DT) to generate a first set of weakly augmented target domain images;
performing strong augmentation on images from a source domain (DS) and the images from the DT to generate a second set of strongly augmented images;
processing the second set of strongly augmented images to generate a third set of inter-domain mixes of the images from the DS and the DT; and
jointly training the object detection machine learning model, as a student machine learning model, with a teacher machine learning model using the first and third sets.

2. The method of claim 1, further including processing images from the second set to generate a fourth set of intra-domain mixes of the images from the DS.

3. The method of claim 2, wherein the object detection machine learning model is further trained using the fourth set.

4. The method of claim 1, wherein the jointly training includes updating weights of the teacher machine learning model based on an exponential moving average of weights of the object detection machine learning model.

5. The method of claim 1, wherein output generated using the teacher machine learning model includes pseudo labels that are used to train the object detection machine learning model.

6. The method of claim 1, further including performing adversarial training of the object detection machine learning model and a discriminator machine learning model, wherein the performing adversarial training includes applying the discriminator machine learning model to a feature embedding generated by the object detection machine learning model to generate a predicted classification of the feature embedding as being in the source DS or the DT.

7. The method of claim 1, wherein the object detection machine learning model includes a feature encoder, a region proposal network (RPN), and a region of interest (ROI) pooling layer.

8. A system comprising one or more processors and memory storing instructions that, in response to execution by the one or more processors, cause the one or more processors to:
- perform weak augmentation on images from a target domain (DT) to generate a first set of weakly augmented target domain images;
- perform strong augmentation on images from a source domain (DS) and the images from the DT to generate a second set of strongly augmented images;
- process the second set of strongly augmented images to generate a third set of inter- domain mixes of the images from the DS and the DT; and
- jointly train an object detection machine learning model, as a student machine learning model, with a teacher machine learning model using the first and third sets.

9. The system of claim 8, further including instructions to process images from the second set to generate a fourth set of intra-domain mixes of the images from the DS.

10. The system of claim 9, wherein the object detection machine learning model is further trained using the fourth set.

11. The system of claim 8, wherein the instructions to jointly train include instructions to update weights of the teacher machine learning model based on an exponential moving average of weights of the object detection machine learning model.

12. The system of claim 8, wherein output generated using the teacher machine learning model includes pseudo labels that are used to train the object detection machine learning model.

13. The system of claim 8, further including instructions to perform adversarial training of the object detection machine learning model and a discriminator machine learning model, wherein to perform the adversarial training includes instructions to apply the discriminator machine learning model to a feature embedding generated by the object detection machine learning model to generate a predicted classification of the feature embedding as being in the DS or the DT.

14. The system of claim 8, wherein the object detection machine learning model includes a feature encoder, a region proposal network (RPN), and a region of interest (ROI) pooling layer.

15. A method for performing cross-domain training of an object detection machine learning model, the method implemented using one or more processors, comprising:
- performing strong augmentation on images from a source domain (DS) and images from a target domain (DT) to generate a first set of strongly augmented source domain images and a second set of strongly augmented target domain images;
- mixing images from the first set of strongly augmented source domain images with images from the second set of strongly augmented target domain images to generate a third set of inter-domain mixed images of the images from the DS and the DT;
- processing images from the first or second sets to generate a fourth set of intra-domain mixed images from the DS or the DT; and
- jointly training the object detection machine learning model, as a student machine learning model, with a teacher machine learning model using the third and fourth sets.

16. The method of claim 15, further including performing weak augmentation on images from the DT to generate a fifth set of weakly augmented target domain images.

17. The method of claim 16, wherein the object detection machine learning model is further trained using the fifth set.

18. The method of claim 15, wherein the jointly training includes updating weights of the teacher machine learning model based on an exponential moving average of weights of the object detection machine learning model.

19. The method of claim 15, wherein output generated using the teacher machine learning model includes pseudo labels that are used to train the object detection machine learning model.

20. The method of claim 15, further including performing adversarial training of the object detection machine learning model and a discriminator machine learning model, wherein performing the adversarial training includes applying the discriminator machine learning model to a feature embedding generated by the object detection machine learning model to generate a predicted classification of the feature embedding as being in the source DS or the DT.

* * * * *